United States Patent [19]

Heinzmann et al.

[11] Patent Number: 5,173,898

[45] Date of Patent: Dec. 22, 1992

[54] MULTIPLE-ACCESS CONTROL FOR A COMMUNICATION SYSTEM WITH ORDER PAD PASSING

[75] Inventors: Peter Heinzmann, Windlach; Johann R. Mueller, Oberrieden; Mehdi M. Nassehi, Horgen, all of Switzerland

[73] Assignee: International Business Machines Corporation, Armonk, N.Y.

[21] Appl. No.: 672,216

[22] Filed: Mar. 20, 1991

[30] Foreign Application Priority Data

Apr. 11, 1990 [EP] European Pat. Off. ........ 90810294.0

[51] Int. Cl.⁵ .............................................. H04J 3/24
[52] U.S. Cl. .................................. 370/94.1; 370/85.1; 370/85.2
[58] Field of Search .................. 370/85.2, 93, 85.1, 370/85.3, 85.7, 94.1

[56] References Cited

U.S. PATENT DOCUMENTS

| 4,528,663 | 7/1985 | Citta ......................................... 370/94 |
| 4,763,321 | 8/1988 | Calvignac et al. .................. 370/85.1 |
| 5,003,531 | 3/1991 | Farinholt et al. ................. 370/85.15 |

FOREIGN PATENT DOCUMENTS 0158364 12/1984 European Pat. Off. .
0393293 10/1990 European Pat. Off. .
2162722 7/1984 United Kingdom .

Primary Examiner—Douglas W. Olms
Assistant Examiner—Shick Hom
Attorney, Agent, or Firm—Joscelyn G. Cockburn

[57] ABSTRACT

In a communication system comprising node stations connected to a bus, a headend unit releases, for sequentially numbered cycles, time slots as previously requested in an order pad passing procedure. In the order pad procedure, the headend issues a special frame in which stations insert the number of slots required to transmit data in a subsequent cycle. To enable reuse of time slots which otherwise would be utilized only during a fraction of their existence (i.e. from a source to a destination which in many cases are located close together), the order pad additionally includes a furthest destination label (DST-MAX) and a requested maximum (REQ-MAX) which are updated at each node. This allows to set, for any cycle, at some nodes a reuse flag (REU-FLG). In this way, the bus is partitioned into sections according to actual traffic, and the headend only releases a number of time slots which satisfies the needs of the section where the maximum of time slots was requested. Thus, the number of time slots, i.e. the length of each cycle can be significantly reduced, thereby increasing system throughput.

18 Claims, 10 Drawing Sheets

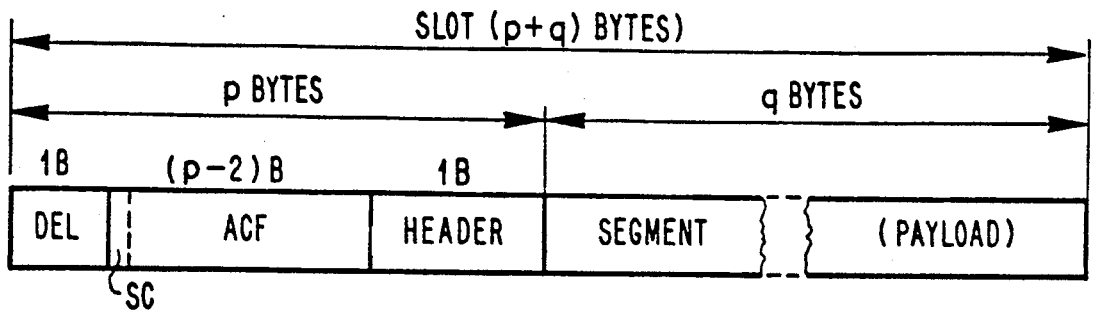
FIG. 3 SLOT STRUCTURE
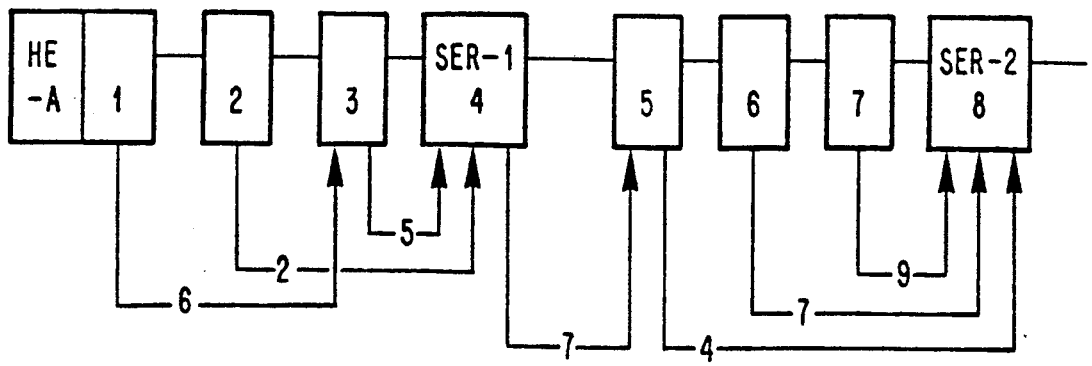
FIG. 4 TYPICAL TRAFFIC SITUATION

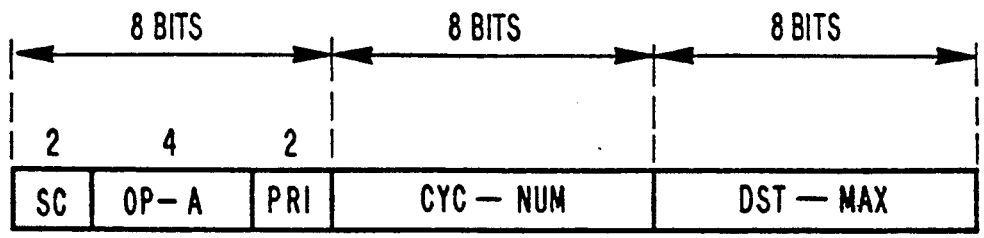
A) ORDER PAD A
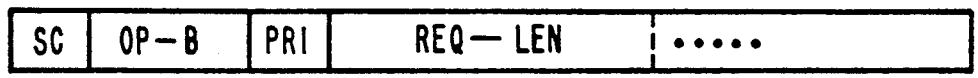
B) ORDER PAD B
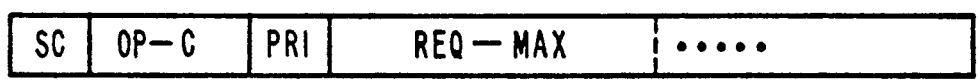
C) ORDER PAD C
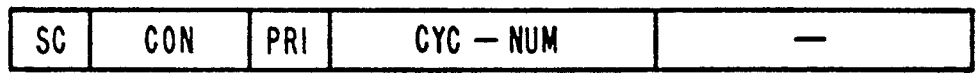
D) CONFIRM
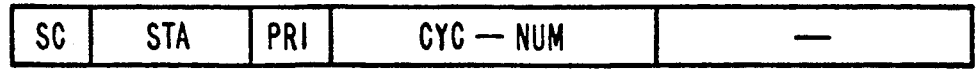
E) CYCLE START
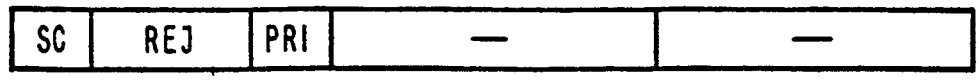
F) REJECT
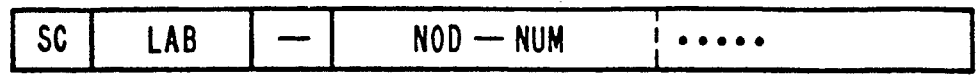
G) LABEL
FIG. 6 MAC COMMANDS (ACF CONTENTS)

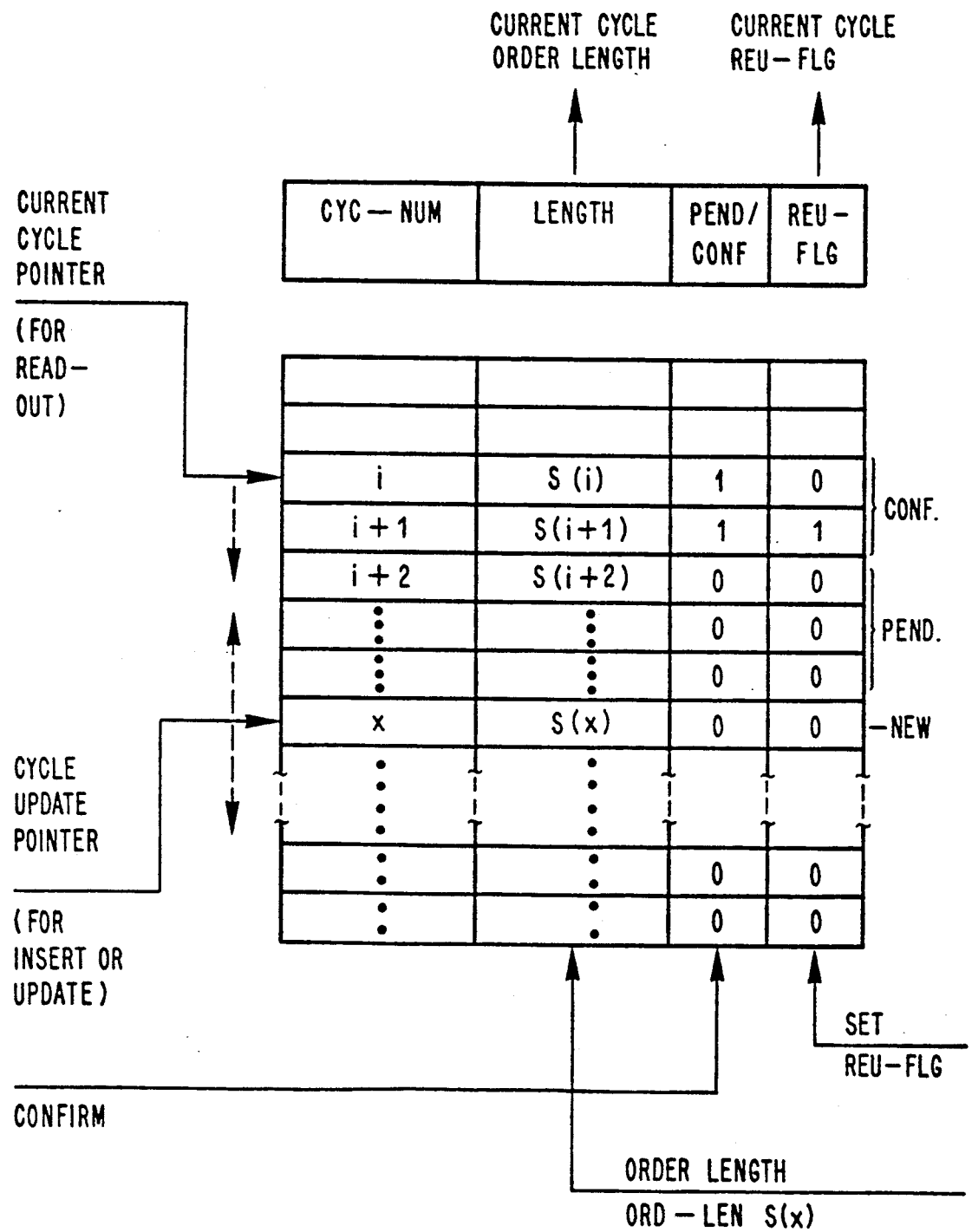
FIG. 7 LOCAL RESERVATION QUEUE

MULTIPLE-ACCESS CONTROL FOR A COMMUNICATION SYSTEM WITH ORDER PAD PASSING

DESCRIPTION

1. Field of Invention

Present invention is concerned with a multiple-access technique for a communication system based on a transmission bus to which several stations or nodes and headend means are connected, and in which for several separate and sequential operation cycles, an order pad is issued by the headend means and passed along the associated bus for insertion of access requests by the node stations. An accumulated count or request length is stored in the headend unit together with the respective cycle number, and when the respective cycle is started, the headend issues the required number of slots so that each node station can definitely use the number of slots it has requested for that cycle.

2. Background

A system of the type described above was disclosed in European Patent Application No. 89810299.1 entitled "Method and Apparatus for Cyclic Reservation Multiple Access in Communication Systems". In a system of that kind, slots of a particular operation cycle are reserved for nodes which have requested them. However, the reservation is by quantity (number of slots) and the slots are not individually assigned to a node.

Each slot, in such a system, is used only for a portion of its passage along the bus, i.e. between the origin node and the destination node of the data which the slot carries in that cycle. In many typical traffic situations, traffic is rather localized and slots will be used only for carrying data between neighborhood nodes.

It would be possible to set each slot to "free" when it has reached the destination, to allow subsequent usage by other nodes. However, this would prevent an ordered access mechanism and in particular the guaranteed availability of consecutive time slots for a node, which is a definite advantage of the described system which uses a cyclic reservation technique based on order pad processing.

OBJECTS OF THE INVENTION

It would be desirable to enable additional usage (reuse) of time slots which have reached their destinations on the bus, without giving up the advantages of the cyclic reservation mechanism used in the known system.

Therefore, it is an object of present invention to enable, in a system using an order pad passing procedure for cyclic reservation multiple-access, the reuse of time slots which would otherwise be utilized during a portion of their passage along the bus.

In particular, it is an object of the invention to allow time slot reuse in such an order pad passing cyclic reservation system, without giving up the advantage of guaranteed availability of the time slots for a node in a consecutive sequence; i.e. all time slots reserved in a particular cycle for a node should be available, despite reuse, without interleaving slots carrying data from other nodes.

SUMMARY OF THE INVENTION

These objects are achieved by a multiple-access method for a communication system in which slots which have reached their destination at a certain node are reused by other downstream nodes.

LIST OF FIGURES

FIG. 3 shows the time slot format used.

FIG. 4 illustrates a typical communication traffic situation on a dual-bus communication system in which a significant advantage can be gained by the invention.

FIGS. 6A-G depicts the medium access control (MAC) commands to be used for the order pad passing reservation procedure.

FIG. 7 shows schematically the local reservation queue of a node, with reuse flags according to the invention.

Figure 8:
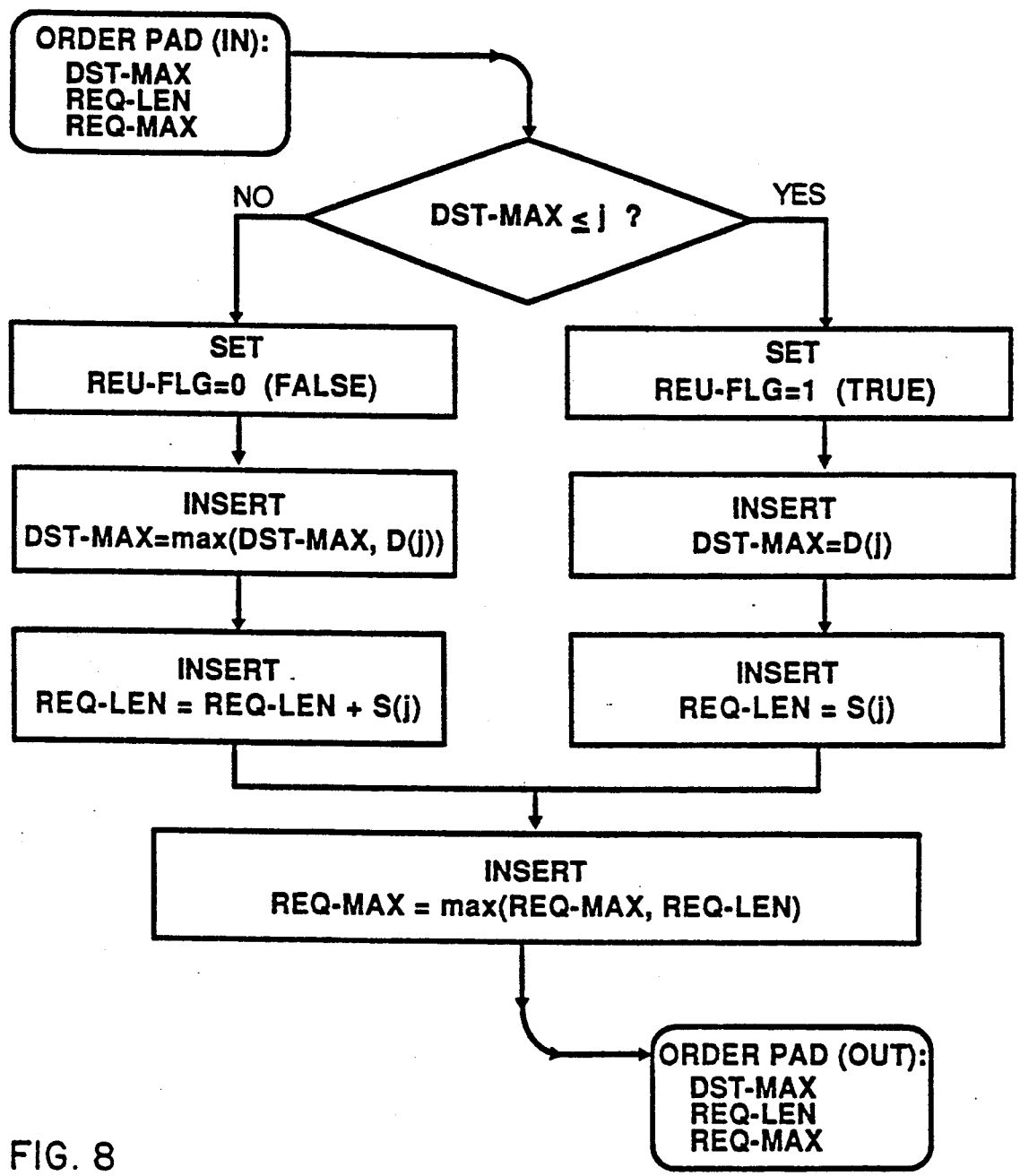

FIG. 8 is a flow diagram of the order pad passing reservation procedure with slot reuse according to the invention.

Figure 9:
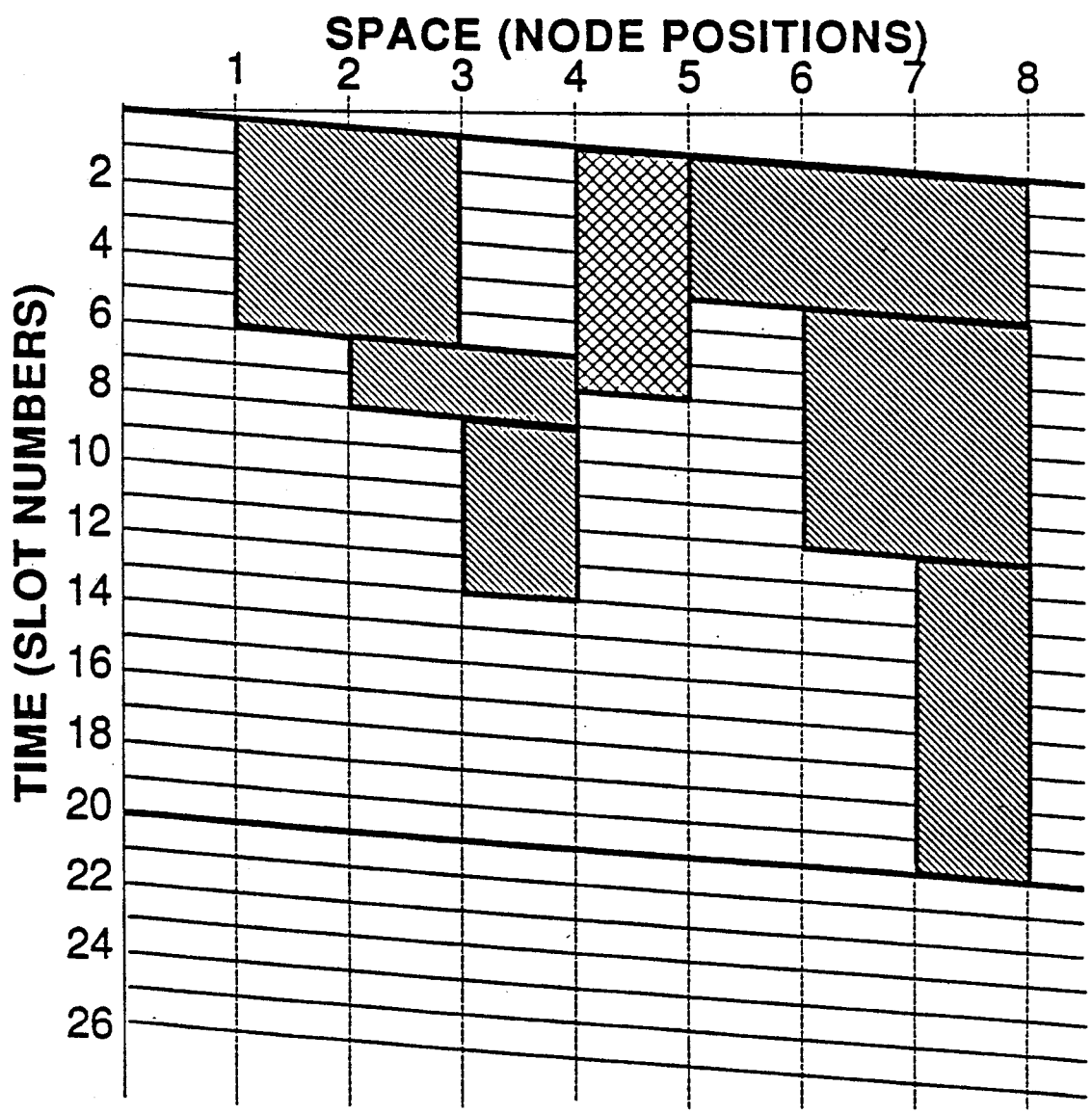

FIG. 9 is a diagram showing the time slot history for the traffic situation of FIG. 4, in a system providing slot reuse according to the invention.

Figure 10A:
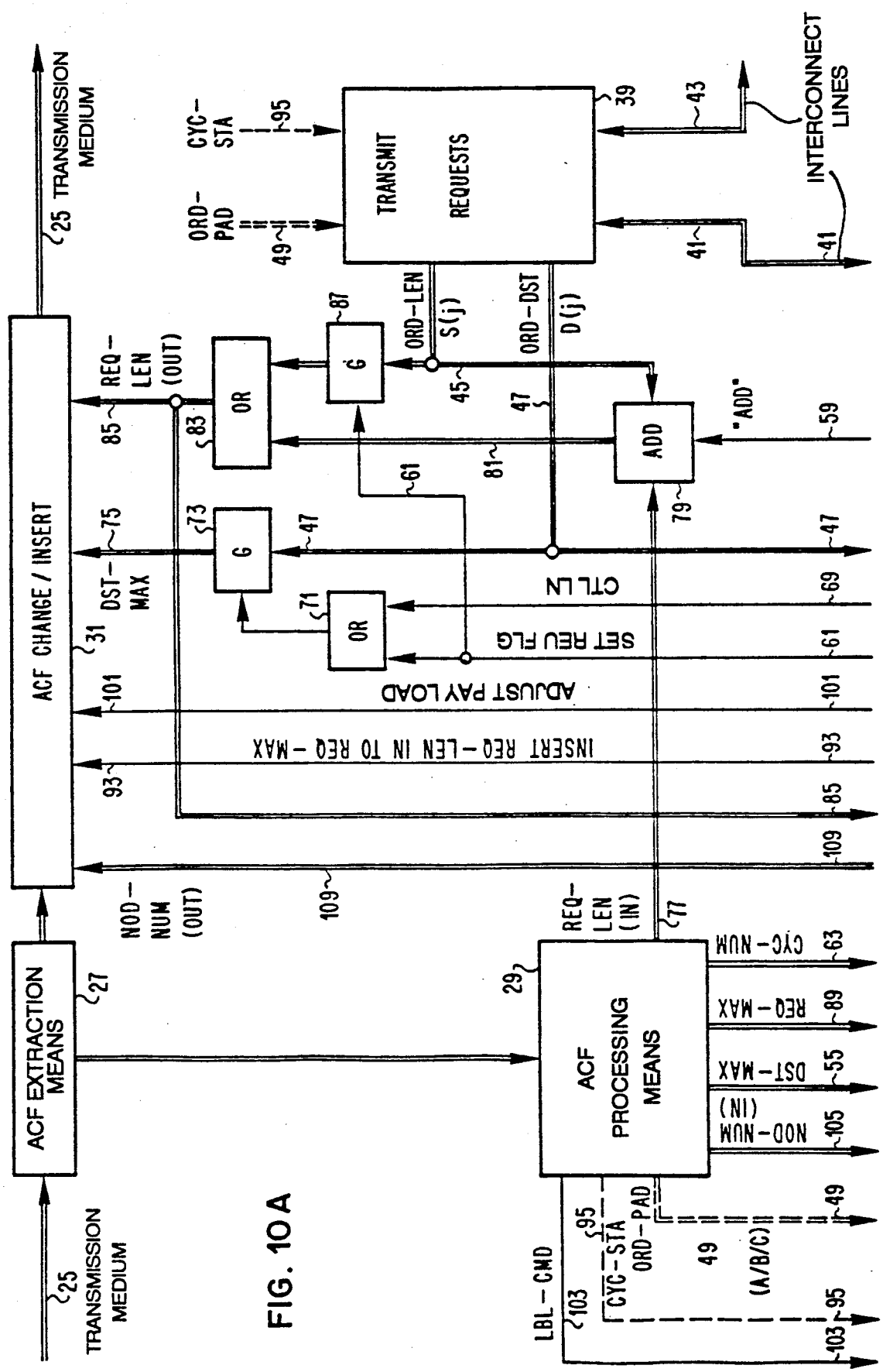
Figure 10B:
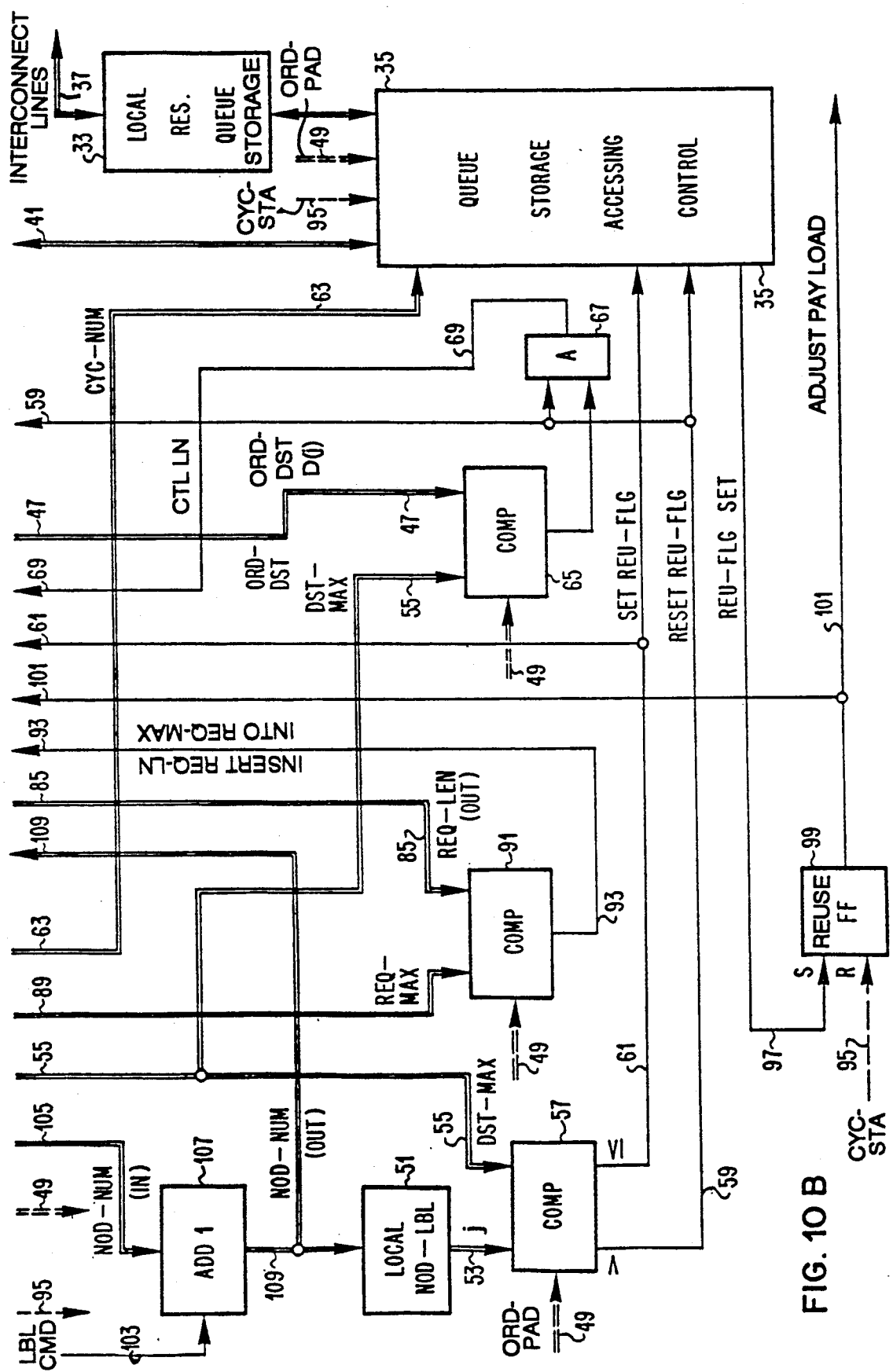

FIG. 10 (10A and 10B) is a block diagram of the node apparatus implementing the invention for providing slot reuse in a dual-bus system with an order pad passing reservation procedure.

ABBREVIATIONS USED

Following is a list of abbreviations used in the description.

Global/Headend Unit

CYC-NUM    Cycle Number
REQ-LEN    Requested Length (=cumulated)
REQ-MAX    Requested Maximum
DST-MAX    Destination Maximum (=ode label of furthest destination)

Local/Nodes

ORD-DST    Order destination=D(j) (=node label of destination to which node j wants to transmit)
ORD-LEN    Order Length=S(j) (=number of slots ordered by node j)
NOD-LBL    Node Label=j

General

ORD-PAD    Order Pad (Command)
STA-CMD    Start Command
REU-FLG    Reuse Flag (in local reservation queue)

DETAILED DESCRIPTION OF THE PREFERRED EMBODIMENT

Environment

Figure 1:
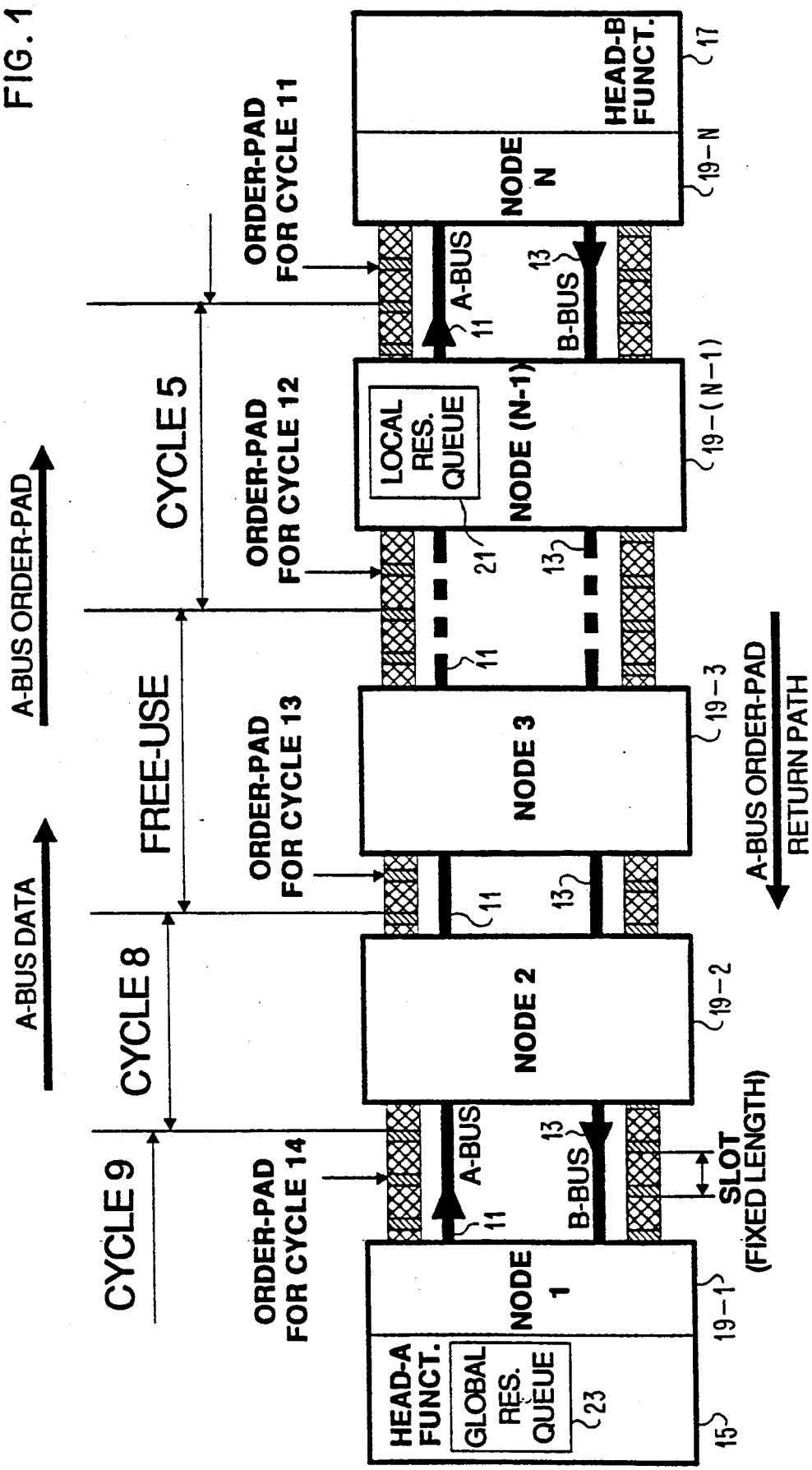
FIG. 1 is a block diagram of a dual bus communication network in which the invention is used.

The environment or general system in which the present invention finds application is shown in FIG. 1. It is a dual-bus communication system with a plurality of nodes or stations attached to each of the busses, and with two headend functions at the ends of the two busses. Each of the headend functions may be integrated with a node station as indicated in FIG. 1 (e.g. headend HEAD-A with node 1). A similar system in which cyclic-reservation multiple access (CRMA) is provided by an order pad passing procedure, is described in European Patent Application No. 89810299.1 (mentioned above already).

The system comprises an A-bus (11) and a B-bus (13) which serve as transmission medium for the one and the other direction. Two headend functions, HEAD-A (15) and HEAD-B (17) are provided. A plurality of node stations (19-1 . . . 19-N) are attached to both busses. Each headend issues fixed-length time slots on its associated bus for use by the nodes. The time slots are organized in sequential cycles (of variable length) as indicated in FIG. 1. Every cycle is explicitly numbered modulo some maximum number.

To regulate access to the transmission medium, i.e. usage of the time slots for data transmission, an order pad passing procedure is used (as described in the above-mentioned European patent application). Each headend issues, on its associated bus, order pads (and other associated commands) which are transmitted at the leading ends of the time slots, as indicated by darker shaded bars in FIG. 1. Each order pad is associated with a (future) transmission cycle; any node that wants to transmit data, requests the required number of slots (the "order length") by adding this quantity to a number in the order pad, the "requested length". It stores the requested number in a Local Reservation Queue, which is shown as box 21 in node N−1, together with the respective cycle number. The order pad, when arriving at the end of the bus, indicates by the accumulated requested length the total number of slots which are required for that cycle. The companion headend, which receives the order pad, returns it on its associated bus to the originating headend. There, the accumulated requested length is stored, together with the cycle number, in a Global Reservation Queue, which is shown in HEAD-A as box 23.

For each cycle, the headend unit issues a cycle start command (also transmitted along the bus in a time slot) containing the respective cycle number, and thereafter releases a number of slots as indicated in its Global Reservation Queue for this cycle. Each station along the bus, after recognizing the cycle start command, then uses a number of consecutive free time slots for data transmission which corresponds to the order length number stored in its Local Reservation Queue with that cycle number.

In low traffic situations, e.g. when an order pad returns to the originating station without any reservations, the headend may issue time slots without a leading cycle start command, as is indicated in FIG. 1 by the section "free use" between cycles 5 and 8 (i.e. order pads for cycles 6 and 7 contained no reservations when returning to the headend). During such a period, any station may use any free slot it sees on the bus, without prior reservation.

Figure 2:
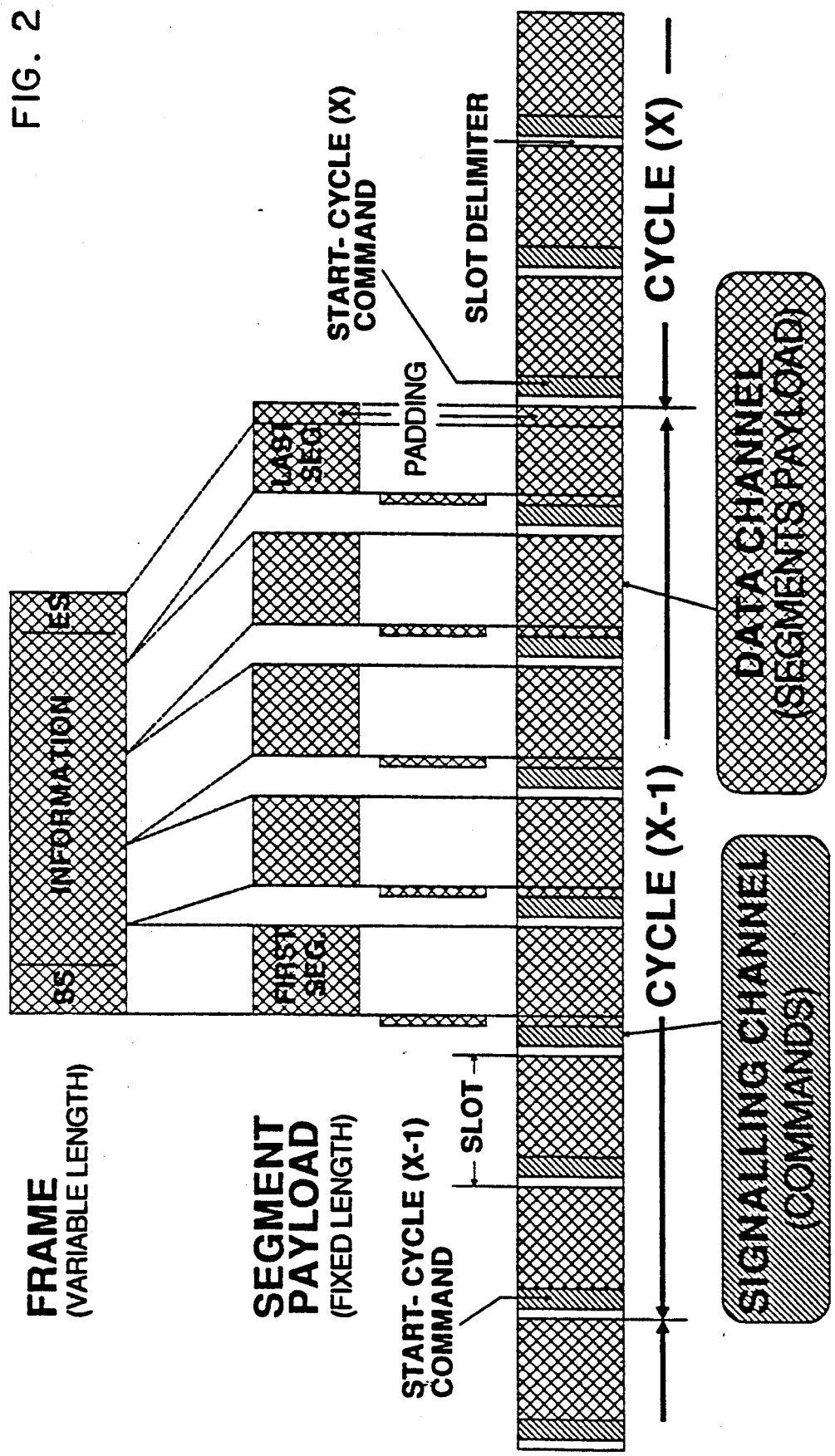
FIG. 2 depicts the segmentation of a data frame which is to be transmitted, into segment payloads for insertion into time slots provided by the dual bus communication system.

In FIG. 2 there is shown the principle for segmenting data frames prior to transmission so that they can be accommodated in the fixed-length time slots propagating on the bus. Each frame (which may be of any length up to a given maximum) and which contains the necessary delimiters SS (start sequence) and ES (end sequence), is simply cut into equal-size segments (payloads) which fit into the fixed-length data segment fields of the time slots. A segment header (e.g. a one byte "type" field) is added to each segment payload for identifying the type of segment payload (e.g. FDDI, 802.2, HPPI data, or begin/middle/end/single segment of a frame) and inserted together with the segment payload into a passing free time slot. Due to the cyclic-reservation multiple access (CRMA) technique roughly described above, each station is guaranteed the availability of n consecutive free time slots in a cycle for which it requested n time slots. This is very important because it eliminates the need for extensive protocol information and consecutive numbering of the segment payloads. They arrive at their destination in consecutive time slots (and of course in the same order as they were transmitted).

As is also shown in FIG. 2, each time slot, besides a segment payload and associated header (together representing a data channel), also includes a section for commands or signalling information (representing a signalling channel), and of course a slot delimiter. Where necessary, a slot is filled up by padding data when the last payload segment does not exactly fit the slot segment size.

FIG. 3 shows the slot format in somewhat more detail. It is assumed here that each slot has a size of $p+q$ bytes (e.g. 58 bytes as an example). The actual data segment for the data payload comprises q bytes (e.g. 53 bytes). The remaining p bytes (e.g. 5 bytes) are provided for system information. One byte represents the slot delimiter, the following bytes are representing an Access Control Field ACF (containing the commands or signalling information, to be explained later in more detail), and the last remaining byte is provided for the segment header (as shown in FIG. 2). The first field (e.g. two bits) of each ACF contains Slot Control (SC) information. One of these bits may indicate whether the slot is a free-use slot not associated with a specific numbered cycle (cf. FIG. 1); the other bit "B/F" indicates whether the slot's data segment is busy (occupied) or free.

The general formats of the Global Reservation Queue and the Local Reservation Queue are shown in the following Table I:

TABLE I

| Global and Local Reservation Queues (without slot reuse) | | | | |
|---|---|---|---|---|
| Global Reservation Queue (for a certain priority class) | | Local Reservation Queues (for a certain priority class | | |
| CYCLE NUMBER | REQUESTED LENGTH | CYCLE NUMBER | ORDER LENGTH | PENDING/ CONFIRMED |

The Global Reservation Queue stored in the headend contains in each entry, as already mentioned above, a cycle number and the associated requested length (i.e. the accumulated number of time slots requested by all the nodes for that cycle).

The Local Reservation Queue contains in each entry a cycle number and an associated order length, i.e. the number of slots requested by the respective station for the cycle indicated. An extra bit in each entry indicates the status of the entry as being pending or confirmed. Initially, the bit is set to zero, indicating pending state. The headend station, depending on the traffic situation, can accept the reservations for a particular cycle by issuing a "Confirm" command with the respective cycle number, or by issuing a "reject" command which cancels all pending reservations of cycles which were not yet confirmed. Each node, when receiving a confirm command, converts the status of the entry for the respective cycle number to "confirmed" by setting the bit to one. Only then, the reservation is valid. However, each station receiving a reject command cancels all reservations which are still in the "pending" status (these reservations must be repeated later). Details of these procedures are also described in the aforementioned European patent application.

It should further be mentioned that several priorities can be provided (e.g. four different priorities). Priorities are implemented by replicating the reservation queues both at the headends and nodes. Thus, for each priority there is a separate reservation mechanism, and separate Local and Global Reservation Queues are maintained. All the commands are then also associated with one of the priorities. Access commands and cycles with higher priority preempt lower priority access commands and cycles. However, to simplify the description, all steps and procedures are only explained for one priority in the following description.

Existing Problem

In the multiple-access procedure described so far, each slot issued by the headend is only used once, i.e. it is utilized only during a portion (fraction) of its propagation along the respective bus.

This is inefficient and a significant improvement is possible in the following typical situation in which data traffic is concentrated in neighborhood (local) sections of the network, as is shown in FIG. 4.

The situation is illustrated in the following example where the nodes 1, 2, and 3 want to transmit 6, 2 and 5 slots to node 3 and to the server-1 (SER-1, i.e. node 4), respectively. Node 4 requests 7 slots destined to node 5, and nodes 5, 6, and 7 are requesting 4, 7, and 9 slots, all destined to the server-2 (SER-2, i.e. node 8).

Figure 5:
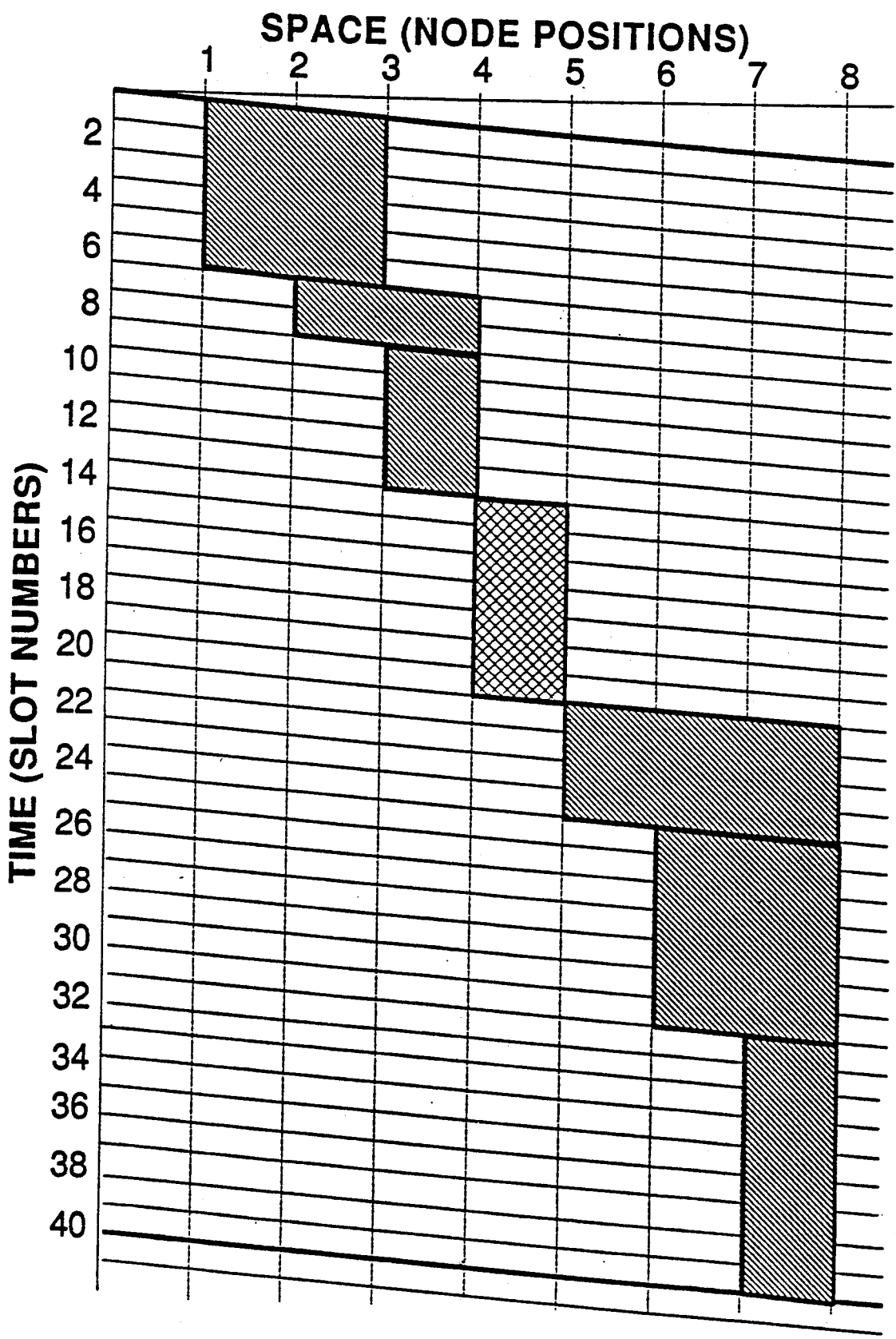
FIG. 5 illustrates the time slot history in the dual-bus system when the invention is not used (no slot reuse).

The required total number of slots (global requested length) for the respective cycle, as can be seen from the order pad history table below, is 40. Thus, the headend must issue 40 slots which, however, are actually utilized only for a fraction of their existence, as is illustrated in FIG. 5 and the following Table II.

TABLE II

| | Processing of the ORDER PAD command at the nodes in CRMA | | |
|---|---|---|---|
| | Requesting node's data | | ORDER PAD when leaving node |
| j = NODE LABEL | D(j) = ORDER DESTINATION | S(j) = ORDER LENGTH | REQUESTED LENGTH |
| 1 | 3 | 6 | 0+6=6 |
| 2 | 4 | 2 | 6+2=8 |
| 3 | 4 | 5 | 8+5=13 |
| 4 | 5 | 7 | 13+7=20 |
| 5 | 8 | 4 | 20+4=24 |
| 6 | 8 | 7 | 24+7=31 |
| 7 | 8 | 9 | 31+9=40 |

The invention provides a major improvement in this situation.

Improved Access Procedure (Reservation Technique) with Slot Reuse

The proposed technique for cyclic-reservation multiple access (CRMA) with slot reuse allows for significant increase in network capacity and reduced access delay under high load without giving up the basic CRMA advantages. This is achieved by introducing more intelligence in the order pad passing process, making use of the fact that slots which have reached their destinations at a certain node could be overwritten i.e., reused by other (downstream) nodes. For that purpose each node is allowed to reset the "requested length" parameter of the order pad to zero, whenever it is guaranteed that all requested slots (i.e. the segment payloads they contain) will have reached their destination upon arrival at this node. Hence, the reservation process can restart as if the order pad was issued by a headend, leading to an overall cycle length which is much shorter than in basic CRMA, i.e. the capacity increases and the access delay is reduced.

In order to decide whether the slots will have reached their destinations, "node labels" which indicate the node positions along the bus must be introduced and some information about the destinations of the requested slots must be included in the order pad command. Furthermore, an indication about the reuse possibility in the data transmission process must be added to the Local Reservation Queues (to be explained later in more detail in connection with FIG. 7). The Global Reservation Queue is not changed.

The order pad command for CRMA with slot reuse (CRMA/SR) contains now three parameters which are processed at the nodes. The "Requested Length" (REQ-LEN) parameter is similar to the same parameter in basic CRMA, except that it contains the accumulated number of ordered slots since its last reset to zero. The "Requested Maximum" (REQ-MAX) parameter saves the absolute maximum of the Requested Length within that cycle. It is initially set to zero and updated by each node whenever the accumulated Requested Length is larger than the current value of Requested Maximum. The "Destination Maximum" (DST-MAX) holds the node label of the most downstream destination of the already requested slots.

The order pad command issued by the headend will thus have the following contents (Table III):

TABLE III

| | Order Pad Command Contents | | |
|---|---|---|---|
| Field | Parameter | Size (Bits), e.g.: | New |
| Command Code | | 6 | — |
| Cycle Number | (Number of Cycle) | 8 | — |
| Cycle Priority | (Priority) | 2 | — |
| Requested Length | (Number of Slots) | 16 | — |
| Requested Maximum | (Number of Slots) | 16 | + |
| Destination Maximum | (Node Label) | 8 | + |

The order pad information is carried in the signalling channel fields of consecutive slots. An example of the possible Access Control Fields (ACF) for typical commands, in particular those for the order pad with slot reuse capability, is shown in FIG. 6. Each ACF field comprises three bytes. The first byte includes two bits for Slot Control (SC) (=free-use bit and busy/free bit); four bits for a command code word; and two bits (PRI)

for the priority. The other two bytes of the ACF field contain the parameter(s) of the respective command. While the commands for confirm, cycle start, and reject are not different for systems providing slot reuse and those providing no slot reuse, the three order pad commands (partial commands) have a modified structure to accomodate the additional fields for the Requested Maximum and the Destination Maximum, respectively (besides the fields for command code, cycle priority, cycle number, and Requested Length). In comparison to the slot structure shown in FIG. 3, described in the aforementioned European patent application, which provided two bytes for the ACF, that field now has a size of three bytes. (However, in order to keep exactly the same slot structure, information of the commands A, B, C could be sent in 6 instead of just 3 slots.) FIG. 6 shows seven different commands; some commands such as RECOVERY or NOOP are not shown here because they are not relevant for the invention. Due to the four-bit command code words, a total of 16 different commands is possible.

The Local Reservation Queues are also modified and contain, in each entry (and for each priority separately), besides the cycle number, requested length, and a pending/confirmed status indication, also a "reuse flag" (REU-FLG), as is illustrated in FIG. 7. The Global Reservation Queue in the headend needs not to be different because the slot reuse mechanism is transparent (not visible) to the headend; it merely takes the Requested Maximum as total (accumulated) requested length instead of the Requested Length per se.

Operation of the new improved reservation and access procedure is illustrated in the flow diagram of FIG. 8.

A node j which wants to transmit S(j) data units (segment payloads) (where S(j)=Order Length) to an Order Destination D(j) makes a reservation for S(j) slots by processing the incoming order pad command as illustrated in FIG. 8. First, the Destination Maximum (DST-MAX), which contains the most downstream destination of all upstream requests, is compared with the own node label j. If the Destination Maximum is smaller than or equal to the node label j, slot reuse is possible, i.e. all requested slots of the upstream nodes will have reached their destinations upon arrival at this node. The node sets in the Local Reservation Queue the "Reuse Flag" REU-FLG(x) for that cycle x (which will cause later, after actual start of the respective cycle, the use of the first data slots after the cycle start command for transmitting the S(j) data units (segment payloads) of that node, and a resetting of all busy/free bits of the remaining slots to "free"). The Destination Maximum is overwritten with the label of the destination where the own slots will be destined to, i.e. with D(j) (=ORD-DST). If a node has no request, it either does not process the command or it used Order Length=0 and Order Destination=0. Finally, node j can overwrite the Requested Length parameter of the order pad with its own Order Length.

If the Destination Maximum is greater than the node label j, slot reuse is not possible. Hence, the 'non-reusing node' sets the Reuse Flag in the Local Reservation Queue to 'false'. The order pad parameter Destination Maximum is only overwritten with D(j) (=Order Destination) if the latter points to a destination further downstream, i.e. if the current Destination Maximum is smaller than D(j). As in CRMA, the number of requested slots S(j) (=ORD-LEN) is added to the order pad parameter Requested Length, i.e. to the accumulated requests of the upstream nodes.

The Requested Maximum reflects the maximum number of requested slots which ever occurred during the passing of this specific order pad, in order to guarantee that the generated cycle length will be sufficient for all transmissions.

The resulting reservation and data transmission process, for the traffic situation that was shown in FIG. 4, is illustrated in the following Table IV and in FIG. 9.

TABLE IV

| Processing of the ORDER PAD command at the nodes in CRMA/SR | | | | | | |
| --- | --- | --- | --- | --- | --- | --- |
| Requesting node's data | | | ORDER PAD when leaving node | | | REUSE FLAG |
| j = NOD-LBL | D(j) = ORD-DST | S(j) = ORD-LNG | DST-MAX | REQ-LNG | REQ-MAX | REU-FLG(x) |
| 1 | 3 | 6 | 3 | 0+6=6 | 6 | true (1) |
| 2 | 4 | 2 | 4 | 6+2=8 | 8 | false (0) |
| 3 | 4 | 5 | 4 | 8+5=13 | 13 | false (0) |
| 4 | 5 | 7 | 5 | 7 | 13 | true (1) |
| 5 | 8 | 4 | 8 | 4 | 13 | true (1) |
| 6 | 8 | 7 | 8 | 4+7=11 | 13 | false (0) |
| 7 | 8 | 9 | 8 | 11+9=20 | 20 | false (0) |

As can be seen, whenever all slots have reached their initial destination (which is the case at node 4 in this example), they can be reused, i.e. all the slots that had been issued by the headend are then available for reuse. The same then happens when all slots have reached their second destination (which is the case at node 5 in the present example), and so on. Thus, each slot can be used several times during its passage along its bus.

The total cycle length, in this example, is reduced by a factor of two because only 20 slots need to be issued by the headend instead of 40 slots.

Implementation of Control Apparatus for Slot Reuse

FIG. 10 is a block diagram of apparatus implementing the control functions for slot reuse in an order pad passing system. This control apparatus is provided in each of the nodes of the dual bus system.

In the transmission medium 25, there is provided ACF extraction means 27 and, connected to it, ACF processing means 29 which receives and tests the data contained in the Access Control Field (ACF) of each slot passing on the transmission medium. ACF change-/insertion means 31 allows to change the information contained in a passing ACF, or to insert new information into specific fields of each passing slot ACF.

Also shown in FIG. 10 are the storage for the Local Reservation Queue 33 (which will not be described in detail) and a queue storage accessing control section 35 connected to it. The Local Reservation Queue is connected to other portions of the node (which are not shown here) by lines 37. A further section contains the transmit requests of the respective node, in particular the desired number of slots and the respective destination, is shown as block 39. It is connected to the queue storage accessing control 35 by lines 41, and to other portions of the node (not shown here) by lines 43. It provides an output lines 45 the desired number of slots as Order Length ORD-LEN S(j), and on lines 47 the node label of the destination as Order Destination ORD-DST D(j).

When one of the order pad commands (A/B/C) is detected, this is indicated by activation of a control signal on one of lines 49 (A/B/C). The local node id (NOD/LBL) j is stored in a register 51 and available on lines 53. The destination Maximum DST-MAX of the arriving ACF is provided on lines 55. Both values are compared in comparing means 57. If DST-MAX is greater than ORD-DST, a control signal is activated on line 59, indicating that no reuse is possible. If DST-MAX is less than or equal to ORD-DST, then a control signal is activated on line 61 indicating that from this node on, slot reuse is possible.

No Slot Reuse:

If no slot reuse is possible, the control signal on line 59 causes resetting of the Reuse Flag in the entry of the Local Reservation Queue for the respective cycle number. The cycle number is provided on lines 63 to queue storage accessing control section 35.

The Destination Maximum DST-MAX appearing on lines 55, and the order Destination ORD-DST appearing on lines 47, are compared in comparison means 65. If the (locally requested) ORD-DST is greater then the arriving DST-MAX, then a control signal is activated on the output of comparison means 65 and passed through AND gate 67, control line (CTL LN) 69 and OR gate 71 to gating means 73 which passes the ORD-DST from lines 47 to a DST-MAX line 75 for insertion into the respective field of the passing slot ACF. If the arriving DST-MAX value was greater then the local ORD-DST, then the DST-MAX in the passing slot ACF is not changed.

Then, the Requested Length which is contained in the next arriving slot ACF appears on lines 77 (REQ-LEN (IN)). It is augmented by the Order Length ORD-LEN S(j) (appearing on lines 45) in adding means 79 and the new augmented Requested Length is furnished via lines 81 and OR gates 83 to lines 85 (REQ-LEN (OUT)) for insertion into the respective field of the passing slot ACF.

Slot Reuse:

If slot reuse is possible from the respective node on, the control signal on line 61 causes the Reuse Flag (REU-FLG) in the entry of the Local Reservation Queue for the respective cycle to be set.

The locally desired Order Destination (ORD-DST) D(j) appearing on lines 47 is gated via gating means 73 to DST-MAX output lines 75 for insertion into the DST-MAX field of the passing slot ACF (the existing value in this field is overwritten). A control signal is furnished to gating means 73 through OR gate 71 from line 61.

Then, the Order Length ORD-LEN (S(j) appearing on lines 45 is gated, by gating means 87, through OR gates 83 to the REQ-LEN (OUT) lines 85 to cause insertion of the locally requested Order Length into the REQ-LEN field of the next slot ACF. The existing value is overwritten (it was saved already by a previous node into the field REQ-MAX).

Finally, for both cases (no slot reuse and slot reuse), the Requested Maximum REQ-MAX of the slot ACF of the third arriving slot comprising an order pad command, appearing on lines 89, is compared in comparing means 91 to the requested length REQ-LEN appearing on lines 85 which was inserted into the ACF of the previous slot. If the Requested Length REQ-LNG is greater than the existing REQ-MAX, the latter is overwritten by the former, caused by a control signal on line 93. Otherwise, the REQ-MAX value in the passing slot ACF is not changed.

Start of Cycle with Slot Reuse:

For starting the slot reuse procedure in a node where the reuse flag REU-FLG was previously set for a specific cycle, the following is provided in the node control circuitry:

When a cycle start command is detected in a slot ACF, a respective signal will be activated on line 95. This causes interrogation of the entry for the respective cycle in the Local Reservation Queue, and if the Reuse Flag is set for that cycle, a respective signal is activated on line 97. This causes the setting of a Reuse Latch 99. Its output signal (Adjust Payload) on line 101, the activated, will cause the node to insert its n payload segments for that cycle into the next n passing slots. The control signal on line 101 further causes the setting of the free/busy bit in all passing slots to "free", until the next cycle start control signal appears which will cause resetting of the Reuse Latch 99. Thus, the respective node will release only free slots (except for the first n slots which it uses for itself) within the current cycle for use by the following nodes downstream.

No further details of the node control circuitry are shown here because they are not relevant for the present invention which is concerned with slot reuse, and because they are described already in the aforementioned European patent application.

Assignment of Node Labels

Labels are required in order to decide during the order pad passing process whether requested slots will have reached their destination when they pass at a certain node. The headend assigns the labels to the nodes via a "label" command which contains a Node Number (NOD-NUM) parameter. The Node Number is initially set to zero. Each active node increments the Node Number by one, uses the result as its label, and passes the command with the incremented parameter to the next node. Hence, the labels are assigned to the nodes such that they correspond to the position of the active nodes down the bus, i.e. the headend gets label "1" and the last node on the bus gets the highest label number. The labels on the A-bus and B-bus are different. The sum of a node's A-Bus label and B-Bus label is equal to the total number of active nodes plus 1 (if the node labels start with 1). Use of the same labels for both buses is possible, but would require slightly different reservation algorithms for the two buses. The assignment of the various types of addresses, e.g. IEEE 802 addresses, to the labels is done via higher layer protocols.

Label Assignment Procedure Implementation:

FIG. 10 also shows the means necessary in each node for implementing the node label assignment procedure. When a label command is received, the respective indicator signal on line 103 is activated. The current node number (NOD-NUM) of the received label command appears on lines 105. It should represent the node label of the previous node upstream the transmission medium. In adding means 107, this node number increased by one unit, and furnished on lines 109 for storing it in the local node label register 51 (thereafter appearing as node label j on its output), and for reinserting the new (increased) node number into the ACF field containing the label command, which further propagates down the transmission medium. When the label command reaches the end of the respective bus, all nodes will have node labels in ascending order.

We claim:

1. A method of multiple-access control in a communication system comprising nodes attached to a transmission bus, in which system time slots are released in numbered cycles and an order pad is passed previously for each numbered cycle, containing a request count (REQ-LEN) which is increased by any node for reserving time slots, said method of multiple-access control comprising the following steps, for reducing the number of time slots which have to be released:

carrying a furthest destination identification (DST-MAX) in each said order pad, which is updated by each node reserving time slots for data transmission to a selected destination node;

determining, from said furthest destination identification, sections of the transmission bus, each between two of said nodes, beyond which no data have to be transmitted in time slots of the respective cycle;

restarting said request count for each such section, and keeping the maximum value of the request count which occurred for any of said sections, as requested maximum (REQ-MAX) for the respective cycle;

releasing, for each cycle, a number of time slots corresponding to the requested maximum for that cycle; and reusing, during each cycle, all time slots which pass a node located between any two of said sections which were determined for that cycle.

2. Method in accordance with claim 1, comprising the following further steps:

assigning identifying node labels (NOD-LBL) to all nodes in ascending order;

providing in each said order pad, besides a cycle number (CYC-NUM) and a field for said request count (REQ-LEN), a field for a furthest destination node label (DST-MAX), and a field for a requested maximum (REQ-MAX);

in each node which wants to reserve time slots for data transmission:
(a) if the furthest destination node label (DST-MAX) in a received order pad is less than or equal to the own local node label, setting a local restart indication (REU-FLG), and restarting the request count (REQ-LEN) in said order pad;
(b) updating, in a received order pad, the request count (REQ-LEN) by adding the locally required number of time slots (ORD-LEN), and updating said furthest destination node label by inserting the selected destination node label (ORD-DST) for the local data to be transmitted if the latter is greater than the furthest destination node label received in the order pad; and
(c) transferring the resulting request count (REQ-LEN) in to the field for the requested maximum (REQ-MAX) if the contents of the latter is smaller than the resulting request count.

3. Multiple-access control method for a communication system comprising nodes attached to a transmission bus and headend means for generating time slots and order pads for numbered cycles; each said order pad comprising a cycle number (CYC-NUM), and a request count (REQ-LEN) which each node can amend by a requested time slot number (ORD-LEN); each node using after start of the respective operation cycle the requested number of free time slots; and each node being identified by a label (NOD-LBL) indicating its position; characterized by the following steps:

providing in each said order pad, fields for a furthest destination node label (DST-MAX) and for a requested maximum (REQ-MAX), the contents of said fields being initially zero;

in each node intending to request time slots for transmitting local data to a selected destination:
(1) comparing said furthest destination node label (DST-MAX) with the own node label (NOD-LBL); and either
(a) if the furthest destination node label is equal to said own node label or identifies an upstream node:
replacing the furthest destination node label (DST-MAX) by the selected destination node's label (ORD-DST);
replacing the current request count (REQ-LEN) by the requested time slot number (ORD-LEN);
storing a local restart indication (REU-FLG) for the respective operation cycle in the requesting node; or
(b) if the furthest destination node label identifies a downstream node:
replacing the furthest destination node label (DST-MAX) by the selected destination node's label (ORD-DST) if the latter is greater;
amending the current request count (REQ-LEN) by the requested time slot number (ORD-LEN); and
(2) replacing the requested maximum (REQ-MAX) by the resulting request count (REQ-LEN) if the latter is greater.

4. Method in accordance with claim 3, characterized in that each order pad is returned to its originating headend means, and that the value of the requested maximum (REQ-MAX) contained in the returning order pad, is stored together with the respective operation cycle number (CYC-NUM) in an entry of a global reservation queue maintained in said headend means.

5. Method in accordance with claim 2 or 3, characterized in that said local restart indication (REU-FLG) is stored, together with a respective cycle number (CYC-NUM) and the number of the requested time slots (ORD-LEN), in an entry of a local reservation queue maintained in each node.

6. Method in accordance with claim 2 or 3, for use in a system where each time slot comprises a busy/free indication which is set to busy when a node enters data into the slot, and in which each operation cycle is started by a numbered cycle start command, characterized in that a node containing a local restart indication (REU-FLG) for any specific cycle, after detecting the cycle start command for that cycle uses the first slots following the cycle start command for transmitting its local data, and then resets the busy/free indication in all following time slots to free until it detects the next cycle start command.

7. Method in accordance with claim 2 or 3, for use in a system in which each said order pad is distributed over the control fields of plural consecutive time slots;

characterized in that the field for said furthest destination node label (DST-MAX) is contained in the first one of said control fields.

8. Method in accordance with claim 2 or 3, characterized in that for assigning node labels in ascending order to said nodes, a label command is issued, containing a node number (NOD-NUM) initially being zero; that each node receiving the label command increases the node number (NOD-NUM) by one unit and then stores the new value of the node number as its own node label (NOD-LBL) and transmits the label command to the next node.

9. Apparatus for allowing multiple use of time slots in a communication system comprising a unidirectional transmission medium (11; FIG. 1), several nodes (19-1 . . . 19-N) connected to it, and a headend means (15) for generating transmission time slots and control information passing on said transmission medium; an order pad being passed for each of plural numbered operation cycles, comprising a request count (REQ-LEN) which each node can amend by a requested time slot number (ORD-LEN); each node using after start of the respective operation cycle the requested number of free time slots; and each node being identified by a label (NOD-LBL) indicating its position; said apparatus comprising:
in said headend means,
means for generating order pads (FIG. 6; A, B, C) including, besides a cycle number (CYC-NUM) and a field for said request count (REQ-LEN), further fields for a furthest destination node label (DST-MAX) and for a requested maximum (REQ-MAX), respectively; and
in each said node,
means (51; FIG. 10) for storing a local node label (NOD-LBL);
means (39) for storing the label (ORD-DST) of a selected destination node to which local data are to be transmitted;
means (57) for comparing the furthest destination node label in a received order pad with the local node label;
means (33, 35, 61) for storing the cycle number together with a reuse flag (REU-FLG) means (31, 47, 73, 75) for inserting the selected destination node's label into the furthest destination node label (DST-MAX) field of the order pad; and
means (31, 95, 97, 99, 101) for making available, after start of a respective operation cycle for which the node has stored a reuse flag, all time slots of that respective operation cycle for use by the respective node or by other nodes further downstream.

10. Apparatus in accordance with claim 9, characterized in that each node further comprises:
means (91) for comparing the requested maximum (REQ-MAX) in a received order pad with the current request count (REQ-LEN); and
means (31, 85, 93) for replacing the requested maximum by the current request count if the latter is greater.

11. Apparatus in accordance with claim 9, characterized in that each node further comprises
means (39) for storing a requested number of slots (ORD-LEN);
means (45, 61, 83, 85, 87) for replacing the current request count (REQ-LEN) in a received order pad by the requested number of slots (ORD-LEN) if the furthest destination node label (DST-MAX) is less than or equal to the local node label (NOD-LBL), but to add the requested number of slots to the current request count if the furthest destination node label is greater than the local node label.

12. In a communications system comprising unidirectional counterflowing transmission busses, at least one headend station for generating order pad messages which are passed on said transmission busses to allow stations connected to said transmission busses to insert information representative of a number of slots required to transmit data in slots subsequently released by said headend in subsequent operation cycles, with each slot corresponding to an earlier released order pad message, an apparatus, in each station, for adjusting information in the order pad message to allow reuse of said slots by selective stations, comprising:
a first means for storing a local node label (NOD-LBL);
a second means for storing a label for at least one destination node (ORD-DST) to which data is to be transmitted;
a third means for storing a cycle number and a reuse flag (REU-FIG);
a fourth means for correlating the local node label with a destination node label (DST-MAX) carried in one of the order pad messages, and to generate therefrom control signals for adjusting the reuse flag; and
a fifth means for monitoring the reuse flag and for making available, after start of a respective operation cycle for which the reuse flag is set in a first state, all time slots of that respective operation cycle for use by the respective station or by other downstream stations.

13. The apparatus of claim 12 further including a sixth means for inserting the label for the at least one destination node (ORD-DST) in a furthest destination node label (DST-MAX) field of said one of the order pad messages received in said station.

14. The apparatus of claim 12 wherein the fourth means includes a comparator.

15. In a communications system comprising unidirectional counterflowing transmission busses, at least one headend station for generating order pad messages which are passed on said transmission busses to allow stations connected to said transmission busses to insert information representative of a number of slots required to transmit data in slots subsequently released by said headend in subsequent operation cycles, with each slot corresponding to an earlier released order pad message an apparatus comprising:
means in said headend for generating the order pad messages which allow stations to adjust information in selected fields of the order pad messages to enable reuse of selected ones of the slots released in subsequent operation cycle; each of said order pad messages including a request count (REQ-LEN) field which each station can amend by inserting its requested time slot number (ORD-LEN), a cycle number (CYC-NUM) field, a requested maximum (REQ-MAX) field and a furthest destination node label (DST-MAX) field for carrying station identification numbers.

16. Multiple-access control method for a communication system comprising nodes attached to a transmission bus and headend means for generating time slots and order pads for numbered cycles; each said order pad comprising a cycle number (CYC-NUM), and a request count (REQ-LEN) which each node can amend by a requested time slot number (ORD-LEN); each node using after start of the respective operation cycle the requested number of free time slots; and each node being identified by a label (NOD-LBL) indicating its position; said method comprising the steps of:

in each node intending to request time slots for transmitting local data to a selected node;

receiving the order pads including fields for a furthest destination node label (DST-MAX) and for a requested maximum (REQ-MAX) number of slots;

(1) comparing said furthest destination node label (DST-MAX) with the own node label (NOD-LBL); and either (a) if the furthest destination node label is equal to said own node label or identifies an upstream node:

replacing the furthest destination node label (DST-MAX) by the selected destination node's label (ORD-DST);

replacing the current request count (REQ-LEN) by the requested time slot number (ORD-LEN);

storing a local restart indication (REU-FLG) for the respective operation cycle in the requesting node; or (b) if the furthest destination node label identifies a downstream node;

replacing the furthest destination node label (DST-MAX) by the selected destination node's label (ORD-DST) if the latter is greater;

amending the current request count (REQ-LEN) by the requested time slot number (ORD-LEN); and (2) replacing the requested maximum (REQ-MAX) by the resulting request count (REQ-LEN) is the latter is greater.

17. In a communications system comprising unidirectional counterflowing transmission busses at least one headend station and a plurality of user stations connected to said busses a method for assigning identification numbers to said stations comprising the steps of:

(a) generating in said headend station a label command message including a node number (NOD-NUM) field carrying a node number set to predetermined value;

(b) transmitting the label command message onto the counterflowing transmission cusses;

(c) receiving the label command message in active stations;

(d) for each active station receiving said label command message adjusting the node number in the node number field; and (e) retransmitting the label command message with adjusted node number to the next active downstream station.

18. The method of claim 17 further including the steps of retaining and using the adjusted node number as the identification number of said node.

* * * * *